United States Patent
Kanda (10) Patent No.: US 10,744,521 B2
(45) Date of Patent: Aug. 18, 2020

(54) WASHER NOZZLE

(71) Applicant: NIPPON VINYLON CO., LTD., Shizuoka (JP)

(72) Inventor: Koichi Kanda, Shizuoka (JP)

(73) Assignee: NIPPON VINYLON CO., LTD., Shizuoka (JP)

( * ) Notice: Subject to any disclaimer, the term of this patent is extended or adjusted under 35 U.S.C. 154(b) by 0 days.

(21) Appl. No.: 15/535,258

(22) PCT Filed: Dec. 14, 2015

(86) PCT No.: PCT/JP2015/084893
§ 371 (c)(1),
(2) Date: Jun. 12, 2017

(87) PCT Pub. No.: WO2016/104209
PCT Pub. Date: Jun. 30, 2016

(65) Prior Publication Data
US 2017/0326560 A1   Nov. 16, 2017

(30) Foreign Application Priority Data

Dec. 25, 2014   (JP) ................................ 2014-262265

(51) Int. Cl.
*B05B 1/08* (2006.01)
*B05B 1/10* (2006.01)
*B60S 1/52* (2006.01)

(52) U.S. Cl.
CPC ............... *B05B 1/10* (2013.01); *B05B 1/08* (2013.01); *B60S 1/52* (2013.01)

(58) Field of Classification Search
CPC .... B05B 1/08; B05B 1/10; B05B 1/02; B05B 1/18; B05B 1/202; B05B 1/262;
(Continued)

(56) References Cited

U.S. PATENT DOCUMENTS 5,749,525 A   5/1998 Stouffer
6,354,515 B1  3/2002 Matsumoto et al.
(Continued)

FOREIGN PATENT DOCUMENTS

JP   58-183255   12/1983
JP   59-9378    3/1984
(Continued)

OTHER PUBLICATIONS

International Search Report dated Mar. 8, 2016 in International (PCT) Application No. PCT/JP2015/084893.
(Continued)

*Primary Examiner* — Chee-Chong Lee
*Assistant Examiner* — Juan C Barrera
(74) *Attorney, Agent, or Firm* — Wenderoth, Lind & Ponack, L.L.P.

(57) ABSTRACT

A supply port receives supply of washing liquid. An oscillation chamber oscillates the washing liquid supplied through the supply port. A jetting section jets the washing liquid oscillated in the oscillation chamber to the outside. The jetting section includes a passage connecting the oscillation chamber and the outside. The washing liquid enters the passage from the oscillation chamber through an entrance, passing through the passage, and emitted through an exit to the outside. A jet port is provided between the entrance and the exit, having a narrower width than those of the entrance and the exit. An outer guide connects the jet port and the exit. An inner guide connects the entrance and the jet port, and configured to conduct the liquid oscillated in the oscillation chamber to the outer guide.

19 Claims, 7 Drawing Sheets

(58) Field of Classification Search
CPC . B05B 1/34; B60S 1/52; Y10S 239/03; Y10T 137/2185; Y10T 137/2224; F15C 1/22
USPC .............................. 239/284.1, 284.2, 589.1
See application file for complete search history.

(56) References Cited

U.S. PATENT DOCUMENTS

2010/0090036 A1* 4/2010 Allen .................. B05B 1/08
239/589.1
2013/0062436 A1 3/2013 Miyauchi et al.

FOREIGN PATENT DOCUMENTS

| JP | 2001-10452 | 1/2001 |
|----|------------|--------|
| JP | 2002-067887 | 3/2002 |
| JP | 2006-089025 | 4/2006 |
| JP | 2009-227209 | 10/2009 |
| JP | 2011-245994 | 12/2011 |
| JP | 2013-001246 | 1/2013 |

OTHER PUBLICATIONS

Extended European Search Report dated Jul. 24, 2018 in corresponding European Patent Application No. 15872778.4.
Notification of Reasons for Refusal dated Jun. 21 2019 in corresponding JP Patent Application No. 2016-566121 with English translation.
Notification of Reasons for Refusal dated Nov. 28, 2019 in corresponding Japanese Patent Application No. 2016-566121, with English-language translation.

* cited by examiner

WASHER NOZZLE

TECHNICAL FIELD

The present invention is related to a washer nozzle jetting liquid such as washing liquid.

BACKGROUND ART

PTL1 discloses a washer nozzle for jetting liquid, such as washing liquid, against a glass window to wash the glass window of a vehicle, such as an automobile.

Figure 1:
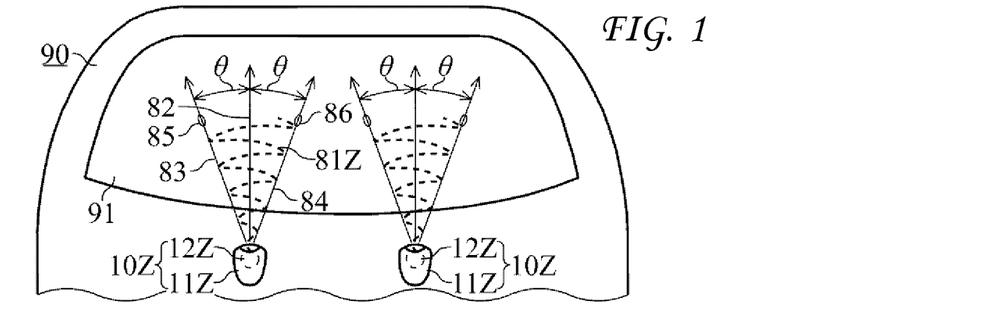
FIG. 1 shows a use mode of a washer nozzle.

As shown in FIG. 1 for example, an automobile 90 includes washer nozzles 10Z. The washer nozzles 10Z are configured to jet washing liquid against a windshield 91. The washing liquid is not jetted as spray, but jetted as a cluster of liquid current 81Z. This enables to hit the washing liquid to required positions of the windshield 91 with no influence from crosswinds or the like.

The jet direction of the liquid current 81Z repeatedly goes and returns between two jet limit directions 83 and 84, which are around a jet central direction 82 as a center. This causes to jet the washing liquid within a range having angles ±θ around the jet central direction 82 as a center. Liquid bundles 85 and 86 are then formed at the jet limit directions 83 and 84. In other words, areas are formed where much washing liquid is hit than the other areas.

The washer nozzle 10Z includes a body 11Z and a jet nozzle 12Z. The body 11Z is configured to supply washing liquid, which is supplied from the automobile 90, to the jet nozzle 12Z. The jet nozzle 12Z is configured to jet the washing liquid, which is supplied from the body 11Z, to the outside.

Figure 2:
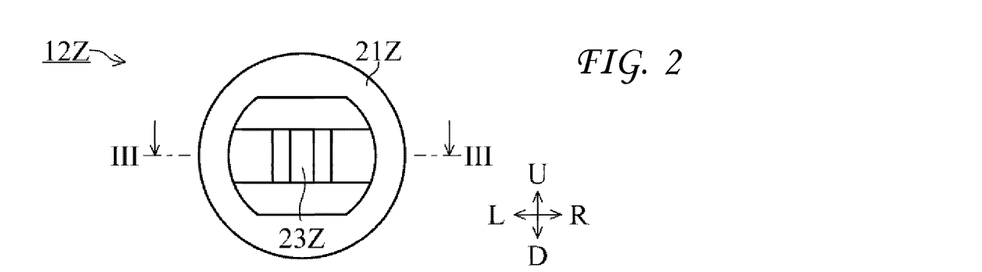
FIG. 2 shows a front view of a jet nozzle.
Figure 3:
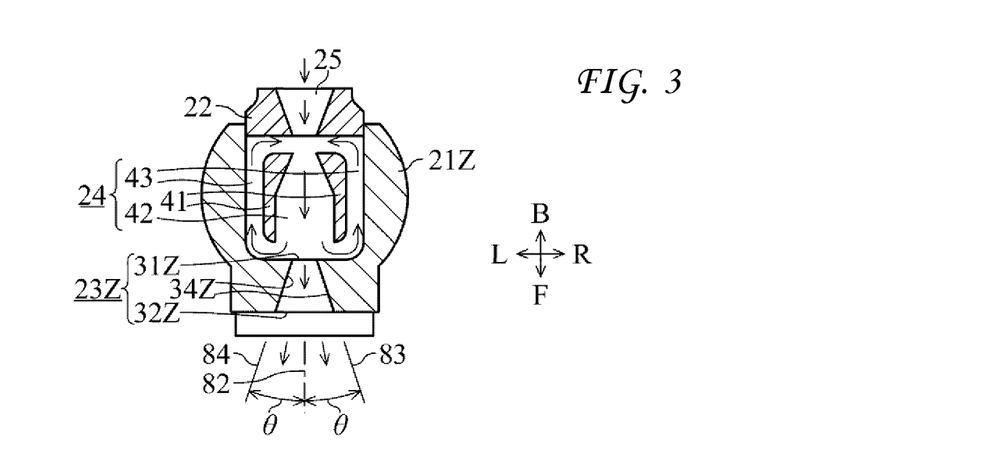
FIG. 3 shows a sectional plan view of a jet nozzle.

As shown in FIGS. 2 and 3, the jet nozzle 12Z has a basically sphere-like shape. The jet nozzle 12Z is fitted to a space with a basically spherical shape, not shown, provided in the body 11Z, to be fixed with minor adjustability of the jet direction of the washing liquid. The jet nozzle 12Z includes a case 21Z, and a chip 22. The case 21Z has a recess provided from B side toward F side. The chip 22 is engaged to the recess of the case 21Z, to be fixed to the case 21Z.

The chip 22 has a supply port 25 in B side. The supply port 25 is configured to receive supply of the washing liquid from the body 11Z. An oscillation chamber 24 is defined between the case 21Z and the chip 22. The oscillation chamber 24 is configured to oscillate the washing liquid supplied through the supply port 25. The case 21Z has a jetting section 23Z in F side. The jetting section 23Z is configured to jet the washing liquid oscillated in the oscillation chamber 24 to the outside.

The oscillation chamber 24 is a space with a basically rectangular-parallelepiped-like shape, having two partition walls 41 therein. The two partition walls 41 divide the oscillation chamber 24 to a main channel 42 and two sub channels 43. The washing liquid supplied through the supply port 25 enters the main channel 42, and is attracted to one of the partition walls 41 by Coandă effect. This prevents the washing liquid from travelling along a reference axis, which passes through a center of the supply port 25 and a center of the main channel 42, and makes it travel toward a slant direction from the reference axis to L side or R side. Part of the washing liquid passing through the main channel 42 is jetted from the jetting section 23Z to the outside. And the rest hits an F-side inner wall of the oscillation chamber 24, goes behind the partition walls 41, passes through the sub channels 43, returns to B side of the oscillation chamber 24, and joins sideways the washing liquid entering the oscillation chamber 24 from the supply port 25. For example, assuming that the washing liquid passing through the main channel 42 is attracted toward the L-side partition wall 41, the washing liquid flows back through the L-side sub channel 43. The returning washing liquid joins the washing liquid passing through the main channel 42. This bends the travelling direction of the washing liquid passing through the main channel 42. When the washing liquid passing through the L-side sub channel 43 joins the washing liquid passing through the main channel 42, the travelling direction of the washing liquid passing through the main channel 42 is bent toward R side, and slants from the reference axis to R side. This causes the washing liquid passing through the main channel 42 to be attracted toward the R-side partition wall 41, and thereby the washing liquid flows back through the R-side sub channel 43. This, in turn, bends the travelling direction of the washing liquid passing through the main channel 42 toward L side, and thereby it slants from the reference axis to L side. This cycle is repeated, and produces oscillation of the travelling direction of the washing liquid passing through the main channel 42. In other words, the direction leans toward L side within some periods, and the direction leans toward R side within other periods. It repeatedly and reciprocatedly changes around F direction, which is parallel with the reference axis, as a center.

The jetting section 23Z includes a passage connecting the oscillation chamber 24 and the outside. The passage has in B side an entrance 31Z where the washing liquid flows in from the oscillation chamber 24. The passage has in F side an exit 32Z where the washing liquid passing through the passage is emitted to the outside. The width of the exit 32Z is greater than that of the entrance 31Z. Guides 34Z are provided between the entrance 31Z and the exit 32Z. The L-side and R-side guides 34Z meet F direction at the angle θ. The washing liquid oscillated in the oscillation chamber 24 enters the jetting section 23Z through the entrance 31Z, guided by the guides 34Z, and jetted through the exit 32Z to the outside. Since the travelling direction of the washing liquid entering the jetting section 23Z through the entrance 31Z is oscillated around F direction as a center, the jet direction of the washing liquid jetted through the jetting section 23Z repeatedly and reciprocatedly varies within a range regulated by the guides 34Z, which is a range between the angles ±θ around F direction as the center.

Figure 4:
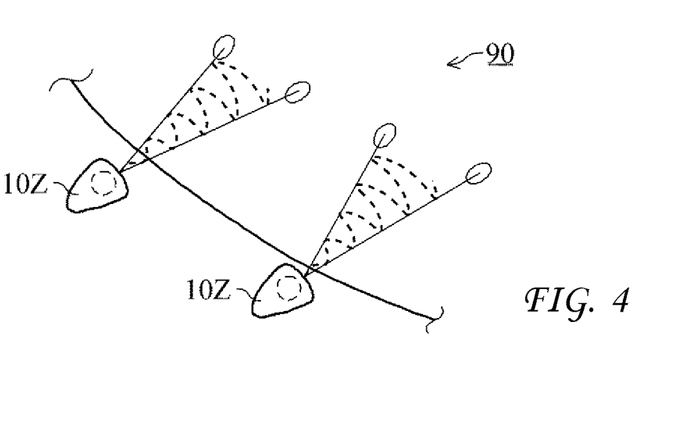
FIG. 4 shows a use mode of a washer nozzle.

To enhance the area where the washing liquid hits, a plurality of the washer nozzles 10Z may be provided as shown in FIG. 4.

Figure 5:
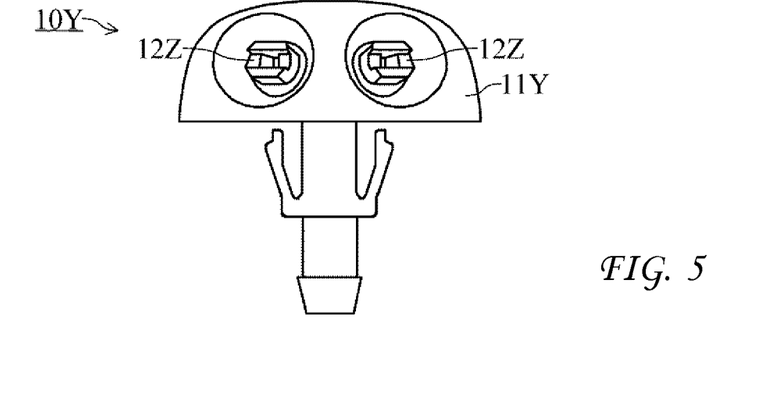
FIG. 5 shows a front view of a washer nozzle.
Figure 6:
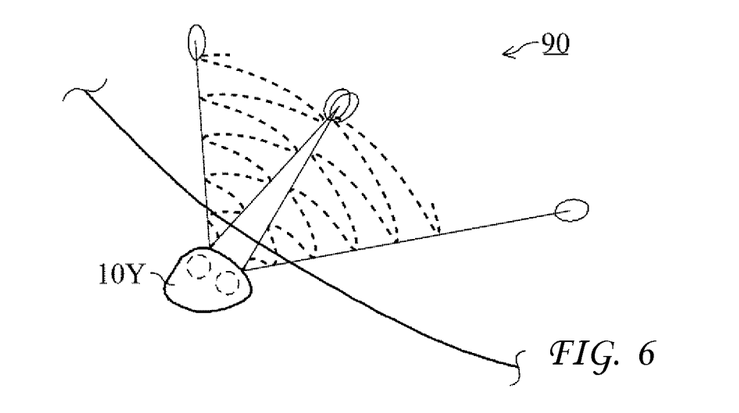
FIG. 6 shows a use mode of a washer nozzle.

A washer nozzle 10Y shown in FIG. 5 includes one body 11Y, and a plurality of the jet nozzles 12Z. Each of the jet nozzles 12Z is arranged toward a different direction from others, to jet the washing liquid toward a different direction from others. This enables the washer nozzle 10Y alone to enhance the area where the washing liquid hits, as shown in FIG. 6.

PRIOR ART DOCUMENTS

Patent Literatures

[PTL1] JP 2011-245994 A

SUMMARY OF INVENTION

Technical Problem

The conventional washer nozzles have the following problems. When the angle θ of the guides is excessively large, the washing liquid is jetted within only a range smaller than that having the angles ±θ. When the washing liquid is required to be jetted within a broad range, e.g., having 90 degrees, some measures are needed, such as providing a plurality of jet nozzles or washer nozzles, as described above.

When the angle of the L-side guide is different from the angle of the R-side guide, the washing liquid is not stably jetted.

When the washing liquid is required to be jetted obliquely, it is needed to slant the jet nozzle or the washer nozzle as a whole toward the direction where the washing liquid is required to be jetted.

As described above, liquid bundles are formed at the jet limit directions. Increase of the jet nozzles causes the liquid bundles to also increase. The number of the liquid bundles can not be set arbitrarily.

The present invention aims to solve some of these problems, to stably jet liquid, such as washing liquid, within a required range.

Solution to Problem

A washer nozzle according to the present invention includes: a supply port configured to receive supply of liquid; an oscillation chamber configured to oscillate the liquid supplied through the supply port; and a jetting section configured to jet the liquid oscillated in the oscillation chamber to the outside. The jetting section includes a passage connecting the oscillation chamber and the outside, and includes: an entrance where the liquid enters the passage from the oscillation chamber; an exit where the liquid is emitted from the passage to the outside; a jet port provided between the entrance and the exit, having a narrower width than those of the entrance and the exit; an outer guide connecting the jet port and the exit; and an inner guide connecting the entrance and the jet port, and configured to conduct the liquid oscillated in the oscillation chamber to the outer guide.

The oscillation chamber is configured to advance the liquid along a reference axis, and to repeatedly and reciprocatedly change a travelling direction of the liquid within a range between first and second directions.

Preferably, an outer development angle may be not greater than an inner development angle. The outer development angle may be an angle where a first outer line meets a second outer line. The first outer line may connect an inner periphery of the jet port and an inner periphery of the exit at a side of the first direction. The second outer line may connect an inner periphery of the jet port and an inner periphery of the exit at a side of the second direction. The inner development angle may be an angle where a first inner line meets a second inner line. The first inner line may connect an inner periphery of the entrance and an inner periphery of the jet port at a side of the first direction. The second inner line may connect an inner periphery of the entrance and an inner periphery of the jet port at a side of the second direction.

Preferably, an outer central line may be substantially equal to an inner central line. The outer central line may bisect the outer development angle. The inner central line may bisect the inner development angle.

Preferably, an outer angle in at least one side of the first and second directions may be not greater than an inner angle in the opposite side. The outer angle may be an angle where the outer line meets the reference axis. The inner angle may be an angle where the inner line meets the reference axis.

Preferably, the outer central line may be not parallel with the reference axis.

Preferably, the inner line in at least one side of the first and second directions may be substantially parallel with the reference axis.

Preferably, the washer nozzle includes a plurality of the jetting sections connected to one oscillation chamber.

Preferably, the outer central line of a first jetting section may be not parallel with the outer central line of a second jetting section.

Preferably, the first outer line in the first jetting section may be substantially parallel with the second outer line in the second jetting section.

Advantageous Effects of Invention

According to the washer nozzle of the present invention, the jet port is provided between the entrance and the exit of the jetting section, the inner guide connects the entrance and the jet port of the jetting section, and the outer guide connects the jet port and the exit of the jetting section. Thereby, the liquid oscillated in the oscillation chamber is conducted to the jet port by the inner guide, and the liquid passing through the jet port is conducted to the outer guide at the opposite side. This enables to stably jet the liquid even when the jet angle is large or the jet direction is slant.

The outer development angle not greater than the inner development angle enables to stably jet the liquid within a range of the outer development angle.

The outer central line substantially equal to the inner central line enables to more stably jet the liquid.

The angle where the reference axis meets one of the outer lines being no greater than the angle where the reference axis meets the inner line at the opposite side enables to more stably jet the liquid.

The outer central line not parallel with the reference axis enables to stably jet the liquid toward a direction different from the reference axis.

One of the inner lines substantially parallel with the reference axis enables to restrain generation of a liquid bundle at the opposite side.

The plurality of the jetting section connected to one oscillation chamber enables to jet the liquid within a broad range by using no more than one jet nozzle.

The outer central line in the first jetting section not parallel with the outer central line in the second jetting section enables to jet the liquid toward different directions.

The first outer line in the first jetting section substantially parallel with the second outer line in the second jetting section continuously links the ranges where the liquid is jetted from the two jetting sections. This enables to jet the liquid within a broad range.

EMBODIMENTS

Embodiment 1

Figure 7:
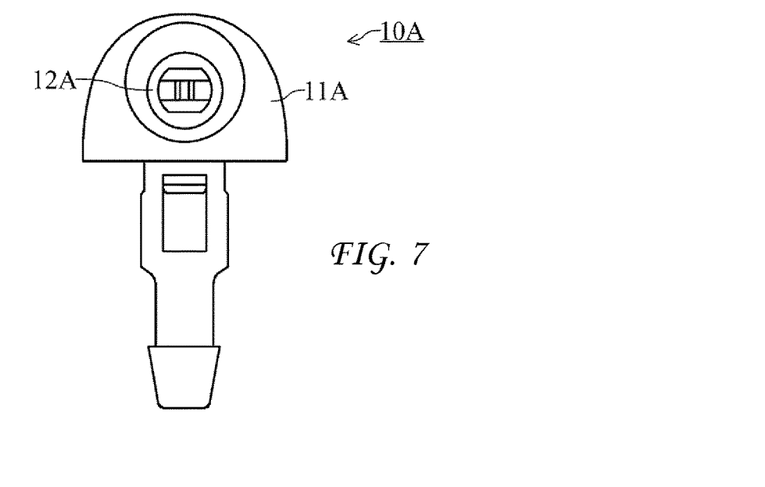
FIG. 7 shows a front view of a washer nozzle.
Figure 8:
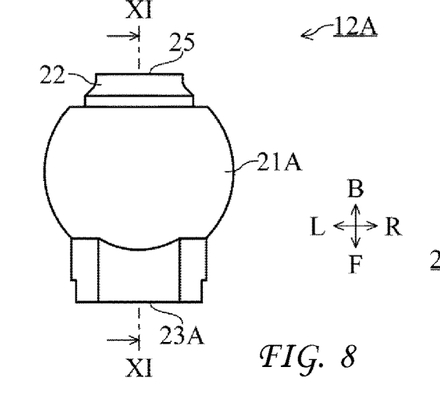
FIG. 8 shows a front view of a jet nozzle.
Figure 9:
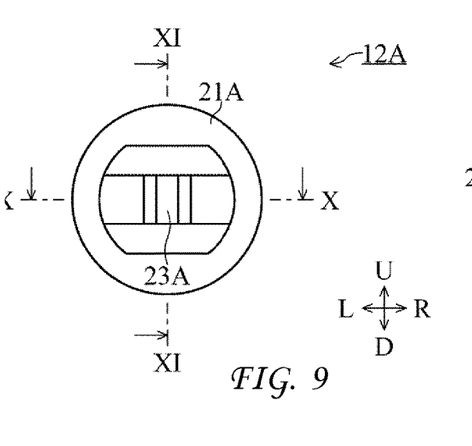
FIG. 9 shows a plan view of a jet nozzle.
Figure 10:
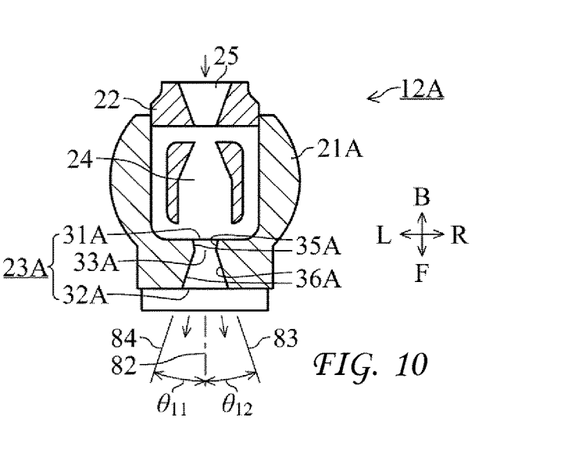
FIG. 10 shows a sectional plan view of a jet nozzle.
Figure 11:
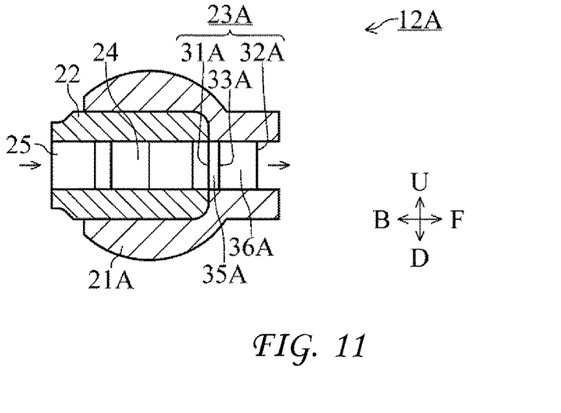
FIG. 11 shows a sectional side view of a jet nozzle.

As shown in FIG. 7, a washer nozzle 10A includes a body 11A, and a jet nozzle 12A. The body 11A is configured to supply washing liquid, which is supplied from an automobile or the like, to the jet nozzle 12A. The jet nozzle 12A is configured to jet the washing liquid, which is supplied through the body 11A, to the outside.

As shown in FIGS. 8 to 11, the jet nozzle 12A has a basically sphere-like shape. The jet nozzle 12A is fitted to a space with a basically spherical shape, not shown, provided in the body 11A, to be fixed with minor adjustability of the jet direction of the washing liquid. The jet nozzle 12A includes a case 21A, and a chip 22. The chip 22 is similar to that illustrated in FIGS. 2 and 3. The case 21A has a recess provided from B side toward F side. The chip 22 is engaged with the recess of the case 21A, to be fixed to the case 21A.

The case 21A has a jetting section 23A at F side. The jetting section 23A is configured to jet the washing liquid oscillated in the oscillation chamber 24 to the outside.

The jetting section 23A is disposed in front of a reference axis of the oscillation chamber 24, which is a central axis where the washing liquid oscillated in the oscillation chamber 24 goes along it. In this example, the oscillation chamber 24 is bilaterally symmetrical. Thereby, the reference axis of the oscillation chamber 24 is the same as the bilaterally symmetrical axis of the oscillation chamber 24. Thus, the jetting section 23A is disposed at a position around the bilaterally symmetrical axis of the oscillation chamber 24 as a center.

The jetting section 23A includes a passage connecting the oscillation chamber 24 and the outside. The passage has an entrance 31A at B side, where the washing liquid flows in from the oscillation chamber 24. The passage has an exit 32A at F side, where the washing liquid passing through the passage is emitted to the outside. A jet port 33A is provided at a middle of the passage, that is, between the entrance 31A and the exit 32A. The entrance 31A and the jet port 33A are connected with inner guides 35A. The jet port 33A and the exit 32A are connected with outer guides 36A.

The passage of the jetting section 23A has a substantially constant height in U-D direction, but the width in L-R direction is not constant. The width of the jet port 33A is smaller than those of the entrance 31A and the exit 32A. The width of the exit 32A may be greater or smaller than that of the entrance 31A. Each of the L-side and R-side outer guides 36A has a substantially plane inner wall. An L-side outer angle $\theta_{11}$, which is an angle where the L-side outer guide 36A meets F direction, is substantially equal to an R-side outer angle $\theta_{12}$, which is an angle where the R-side outer guide 36A meets F direction.

The jet nozzle 12A is configured to jet the washing liquid toward directions within a range between two jet limit directions 83 and 84 around a jet central direction 82 as a center. The jet central direction 82 is parallel with F direction. An L-side jet limit angle, which is an angle where the jet central direction 82 meets the jet limit direction 84, is almost equal to the L-side outer angle $\theta_{11}$. An R-side jet limit angle, which is an angle where the jet central direction 82 meets the jet limit direction 83, is almost equal to the R-side outer angle $\theta_{12}$.

The jet port 33A is provided at the middle of the jetting section 23A, and the inner guide 35A connects the entrance 31A and the jet port of the jetting section 23A. This enables to stably jet the washing liquid toward directions within a range from the jet limit direction 83 to the jet limit direction 84, even when the outer angles $\theta_{11}$ and $\theta_{12}$ are large.

Embodiment 2

Figure 12:
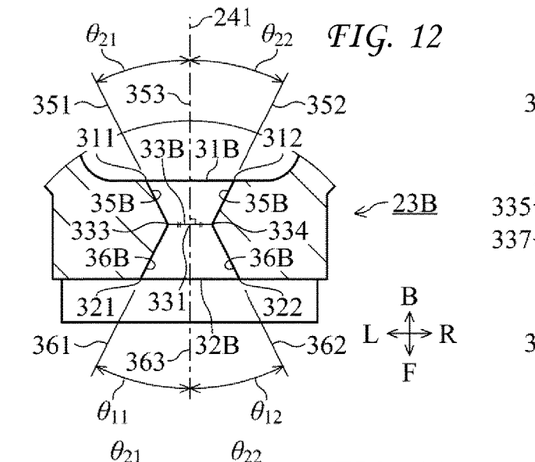
FIG. 12 shows a sectional plan view of a jetting section.

FIG. 12 shows another jetting section 23B having a different shape from the jetting section 23A described above. The washer nozzle 10A may include the jetting section 23B in place of the jetting section 23A.

In this example, a jet port 33B is located closer to F side than the jet port 33A. So long as the location of the jet port is between the entrance and the exit, it may be relatively close to the entrance, or close to the middle of the entrance and the exit. Furthermore, it may be relatively close to the exit.

Each of L-side and R-side inner guides 35B has a substantially plane inner wall. An inner angle $\theta_{21}$ where the L-side inner guide 35B meets F direction is equal to an inner angle $\theta_{22}$ where the R-side inner guide 35B meets F direction.

A reference axis 241 of the oscillation chamber 24 is a central axis where the washing liquid oscillated in the oscillation chamber 24 go along it. It may be different from the bilaterally symmetrical axis of the oscillation chamber 24. In the first place, the oscillation chamber 24 may be asymmetrical.

An inner central line 353 is a line bisecting an angle where two inner lines 351 and 352 meet each other. It substantially coincides with the reference axis 241. The inner line 351 is a line in a plane perpendicular to U-D direction, connecting an inner periphery of the entrance 31B at L side, in other words, a B side end 311 of the L-side inner guide 35B, and an inner periphery of the jet port 33B at L side, in other words, an F side end 333 of the L-side inner guide 35B. The inner line 352 is a line in a plane perpendicular to U-D direction, connecting an inner periphery of the entrance 31B at R side, in other words, a B side end 312 of the R-side inner guide 35B, and an inner periphery of the jet port 33B at R side, in other words, an F side end 334 of the R-side inner guide 35B.

An outer central line 363 is a line bisecting an angle where two outer lines 361 and 362 meet each other. It substantially coincides with the reference axis 241. The outer line 361 is a line in a plane perpendicular to U-D direction, connecting an inner periphery of the jet port 33B at L side, in other words, a B side end 333 of the L-side outer guide 36B, and an inner periphery of the exit 32B at L side, in other words, an F side end 321 of the L-side outer guide 36B. The outer line 362 is a line in a plane perpendicular to U-D direction, connecting an inner periphery of the jet port 33B at R side, in other words, a B side end 334 of the R-side outer guide 36B, and an inner periphery of the exit 32B at R side, in other words, an F side end 332 of the R-side outer guide 36B.

The jet port 33B is arranged to be substantially perpendicular to the reference axis 241. A center 331 of the jet port 33B is located on the reference axis 241.

When the washing liquid oscillated in the oscillation chamber 24 goes toward a direction oblique from F direction to L side and hits the L-side inner guide 35B, it goes along the L-side inner guide 35B, and passes through the jet port 33B. The travelling direction of the washing liquid at this time is a direction oblique to R side meeting F direction at the inner angle $\theta_{21}$. If the washing liquid passing through the jet port 33B hits the R-side outer guide 36B, it goes along the R-side outer guide 36B, and is emitted through the exit 32B to the outside. The travelling direction, or the jet direction, of the washing liquid at this time is a direction oblique to R side meeting F direction at the outer angle $\theta_{12}$. Thus, the R-side jet limit angle is substantially equal to the smaller one of the L-side inner angle $\theta_{21}$ and the R-side outer angle $\theta_{12}$.

This is also applied to the L-side jet limit angle. The L-side jet limit angle is substantially equal to the smaller one of the R-side inner angle $\theta_{22}$ and the L-side outer angle $\theta_{11}$.

As described, the washing liquid hitting the inner guide 35B passes through the jet port 33B, and is jetted toward the opposite side. This enables to stably jet the washing liquid toward a broader range than conventional one.

Especially when the L-side inner angle $\theta_{21}$ is greater than or equal to the R-side outer angle $\theta_{12}$, the R-side jet limit angle is substantially equal to the R-side outer angle $\theta_{12}$. In the same manner, when the R-side inner angle $\theta_{22}$ is greater than or equal to the L-side outer angle $\theta_{11}$, the L-side jet limit angle is substantially equal to the L-side outer angle $\theta_{11}$. This enables to stably jet the jetted liquid within a range regulated by the outer angles $\theta_{11}$ and $\theta_{12}$. In this case, the inner development angle $\theta_2$, which is a sum of the two inner angles $\theta_{21}$ and $\theta_{22}$, is greater than or equal to the outer development angle $\theta_1$, which is a sum of the two outer angles $\theta_{11}$ and $\theta_{12}$.

Embodiment 3

Figure 13:
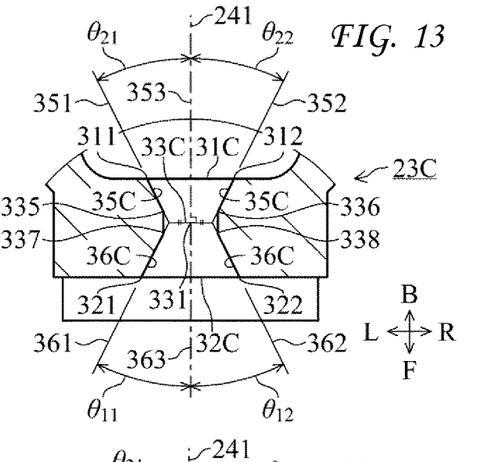
FIG. 13 shows a sectional plan view of a jetting section.

FIG. 13 shows another jetting section 23C having a further different shape. The washer nozzle 10A may include the jetting section 23C in place of the jetting section 23A.

In this example, a jet port 33C has a predetermined length in F-B direction. So long as the length of the jet port is shorter than the whole length of the passage of the jetting section, it may be long or short.

In this case, an inner central line 353 and an outer central line 363 substantially coincide with the reference axis 241. The jet port 33C is arranged to be substantially perpendicular to the reference axis 241. In other words, the reference axis 241 perpendicularly bisects a line segment connecting a point where an inner line 351 meets an outer line 361 in L side, and a point where an inner line 352 meets an outer line 362 in R side. In this case, the inner lines 351 and 352 are lines connecting B-side ends of the inner guide 35C, in other words, inner peripheries 311 and 312 of the entrance 31C, and F-side ends of the inner guide 35C, in other words, inner peripheries 335 and 336 of the jet port 33C at a B-side end, respectively. The outer lines 361 and 362 are lines connecting B-side ends of the outer guide 36C, in other words, inner peripheries 337 and 338 of the jet port 33C at a F-side end, and F-side ends of the outer guide 36C, in other words, inner peripheries 321 and 322 of the exit 32C, respectively.

Embodiment 4

Figure 14:
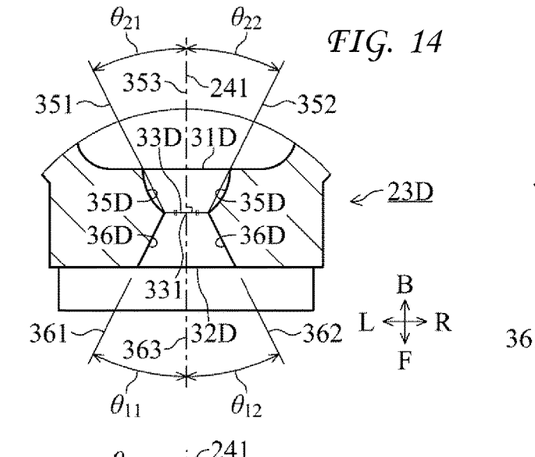
FIG. 14 shows a sectional plan view of a jetting section.

FIG. 14 shows another jetting section 23D having a further different shape. The washer nozzle 10A may include the jetting section 23D in place of the jetting section 23A.

In this example, each of L-side and R-side inner guides 35D has a curved surface. It may be a cylindrical surface over an algebraic curve such as an arc of a circle or an ellipse, a sine or cosine curve, a hyperbola, or a trochoid, or other curves. Also, it may be a curved surface where a sectional shape changes depending on positions in U-D direction. Preferably, the inner guide has a concaved shape in contrast with the inner lines 351 and 352.

As described, the inner guide is not limited to have a plane surface. It may have a curved surface. Furthermore, it may have a plural of plane surfaces and/or curved surfaces. This is also applied to the outer guide.

Embodiment 5

Figure 15:
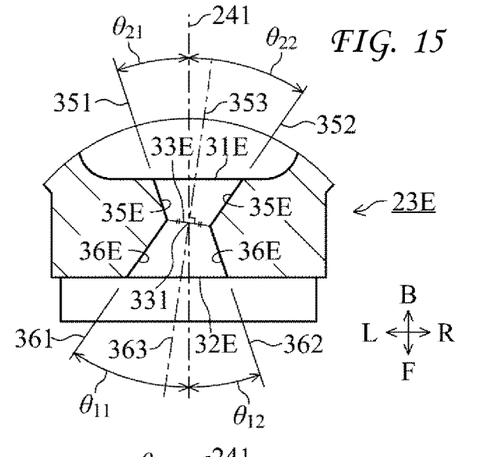
FIG. 15 shows a sectional plan view of a jetting section.

FIG. 15 shows another jetting section 23E having a further different shape. The washer nozzle 10A may include the jetting section 23E in place of the jetting section 23A.

In this example, two outer angles $\theta_{11}$ and $\theta_{12}$ are not equal. Also, two inner angles $\theta_{21}$ and $\theta_{22}$ are not equal. Thus, an inner central line 353 and an outer central line 363 do not coincide with the reference axis 241. But the inner central line 353 and the outer central line 363 substantially coincide with each other. In other words, the shape of the jetting section 23E corresponds to one obtained by rotating the jetting section 23B by a predetermined angle around the center 331.

As described, even when the jetting section is slanted as a whole, the R-side inner angle $\theta_{22}$ greater than or equal to the L-side outer angle $\theta_{11}$ ensures the washing liquid hit the R-side inner guide 35E to hit the L-side outer guide 36E. This makes the L-side jet limit angle substantially equal to the L-side outer angle $\theta_{11}$. In the same manner, the L-side inner angle $\theta_{21}$ greater than or equal to the R-side outer angle $\theta_{12}$ makes the R-side jet limit angle substantially equal to the R-side outer angle $\theta_{12}$. This enables to stably jet the jetted liquid within a range regulated by the outer angles $\theta_{11}$ and $\theta_{12}$.

As described, the two outer angles $\theta_{11}$ and $\theta_{12}$ set to different angles enables to jet the washing liquid toward a range around a direction different from F direction as a center.

Embodiment 6

Figure 16:
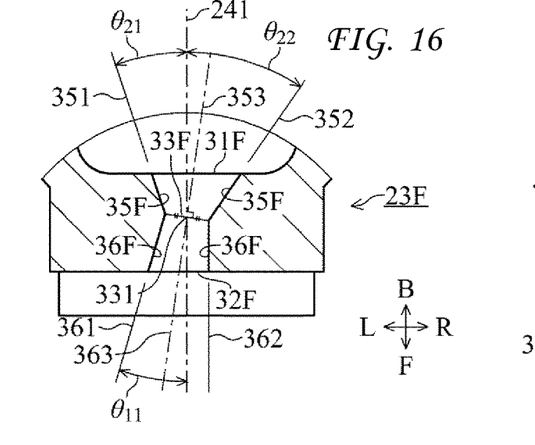
FIG. 16 shows a sectional plan view of a jetting section.

FIG. 16 shows another jetting section 23F having a further different shape. The washer nozzle 10A may include the jetting section 23F in place of the jetting section 23A.

In this example, an R-side outer line 362 is substantially parallel to the reference axis 241. In other words, an R-side outer angle $\theta_{12}$ is almost zero. So long as the exit has a width broader than that of the jet port, which means the outer guide inclines outward as a whole, one of the outer lines may be parallel to the reference axis 241, instead of inclining outward.

Embodiment 7

Figure 17:
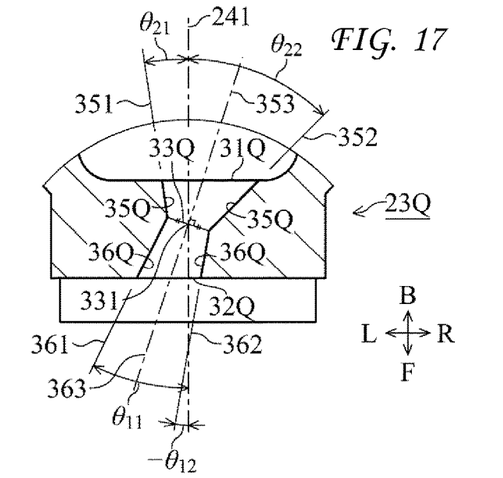
FIG. 17 shows a sectional plan view of a jetting section.

FIG. 17 shows another jetting section 23Q having a further different shape. The washer nozzle 10A may have the jetting section 23Q in place of the jetting section 23A.

In this example, the jetting section 23Q is more largely slant as a whole than the jetting section 23F, which results in an R-side outer line 362 slant inward. In the other word, an R-side outer angle $\theta_{12}$ is negative. So long as the inner angle is not negative, the jetting section may be slanted as a whole to cause the outer line to incline inward. This enables to largely slant the jet direction of the washing liquid.

Embodiment 8

Figure 18:
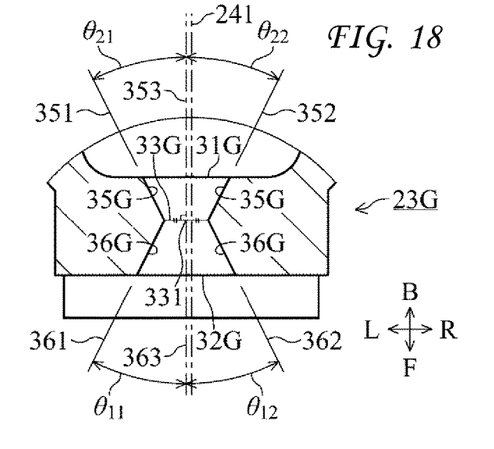
FIG. 18 shows a sectional plan view of a jetting section.

FIG. 18 shows another jetting section 23G having a further different shape. The washer nozzle 10A may include the jetting section 23G in place of the jetting section 23A.

In this example, an jetting section 23G has a similar shape to the jetting section 23B, but located at a different position from it. The jetting section 23G is located at a slightly moved position toward L direction from a front of the travelling direction of the washing liquid oscillated in the oscillation chamber 24. In other words, the center 331 of the jet port 33G is not located on the reference axis 241. As described, the jetting section may be located at a moved position toward L direction or R direction from a front of the travelling direction of the washing liquid oscillated in the oscillation chamber 24. An inner central line 353 and an outer central line 363 are substantially parallel to the reference axis 241.

As described, a location of the jetting section shifted toward L direction or R direction shifts a jet range of the washing liquid together by almost the same as the shift amount of the jetting section toward L direction or R direction. However, a jet direction of the washing liquid is not changed. In other words, an L-side jet limit angle is substantially the same as the L-side outer angle $\theta_{11}$, and an R-side jet limit angle is substantially the same as the R-side outer angle $\theta_{12}$.

Embodiment 9

Figure 19:
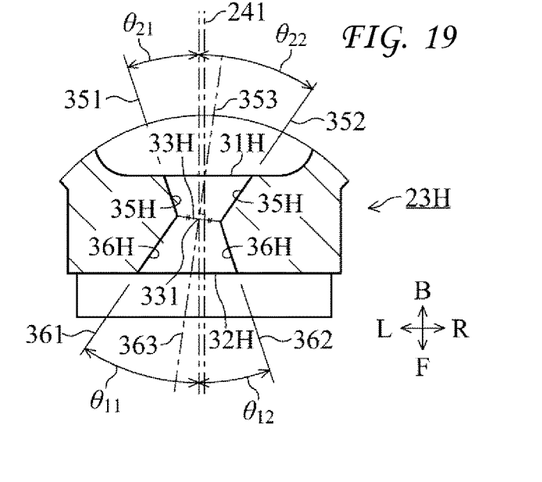
FIG. 19 shows a sectional plan view of a jetting section.

FIG. 19 shows another jetting section 23H having a further different shape. The washer nozzle 10A may include the jetting section 23H in place of the jetting section 23A.

This example is a combination of the jetting section 23E and the jetting section 23G. In other words, the jetting section 23H has a similar shape to the jetting section 23E, but located at a different position from it, which is a slightly moved position toward L direction from a front of the travelling direction of the washing liquid oscillated in the oscillation chamber 24. As described, the embodiments described above can be arbitrarily combined.

In the same manner as the jetting section 23E, the jetting section 23H slanted toward L side makes the jet direction of the washing liquid slant toward L direction. The jetting section slant toward L side as a whole means a center of the entrance of the jetting section shifted toward an R direction. However, the jetting section moved toward L direction as a whole shifts the center of the entrance toward an L direction, which means cancellation of the shift amount. Thereby, the entrance 31H is located approximately in front of the travelling direction of the washing liquid oscillated in the oscillation chamber 24. As described, the jetting section shifted as a whole toward the same direction as a direction toward which the jetting section is slanted as a whole enables to prevent the location of the entrance from moving. This enables to considerably slant the jetting section as a whole, and thereby to considerably slant the jet direction of the washing liquid.

Figure 20:
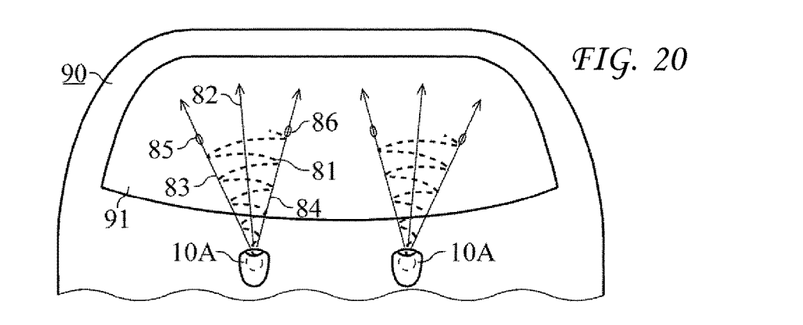
FIG. 20 shows a use mode of a washer nozzle.

As shown in FIG. 20, using the washer nozzle 10A with a jetting section having ability to slant the jet direction of the washing liquid, such as the jetting sections 23E to 23H, enables to alter the jet direction of the washing liquid without turning a direction of the washer nozzle 10A. Changing the structure of the automobile 90 side is not required. Exchanging the washer nozzle, especially only exchanging the jet nozzle, enables to arbitrarily alter the jet direction of the washing liquid.

Embodiment 10

Figure 21:
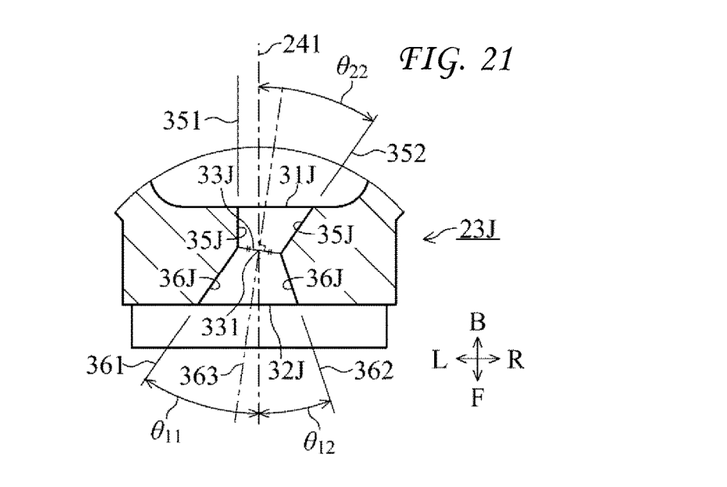
FIG. 21 shows a sectional plan view of a jetting section.

FIG. 21 shows another jetting section 23J having a further different shape. The washer nozzle 10A may include the jetting section 23J in place of the jetting section 23A.

In this example, an L-side inner line 351 is substantially parallel to the reference axis 241. In other words, an L-side inner angle $\theta_{21}$ is almost zero. So long as the entrance has a width broader than that of the jet port, which means the inner guide inclines inward as a whole, one of the inner lines may be parallel to the reference axis 241, instead of inclining inward. This example can be combined with one or more of the embodiments described above.

The L-side inner line 351 almost parallel to the reference axis 241 reduces the washing liquid hitting the L-side inner guide 35J. Since the washing liquid hitting the inner guide 35J is jetted toward the opposite side, less washing liquid is jetted toward R side in contrast with F direction. This enables to restrain formation of liquid bundle at R side.

Figure 22:
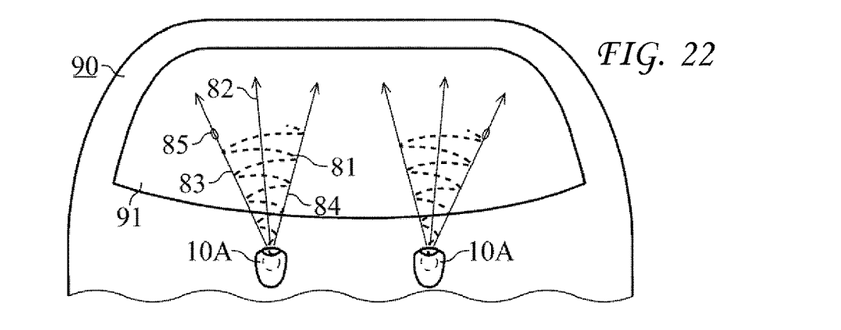
FIG. 22 shows a use mode of a washer nozzle.

As shown in FIG. 22, using the washer nozzle 10A with a jetting section having ability to restrain formation of liquid bundle, such as the jetting section 23J, enables to reduce the number of the liquid bundles.

Embodiment 11

Figure 23:
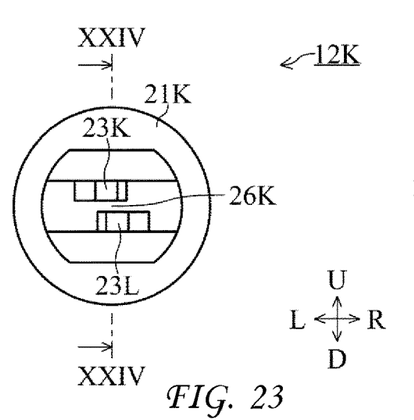
FIG. 23 shows a front view of a jet nozzle.
Figure 24:
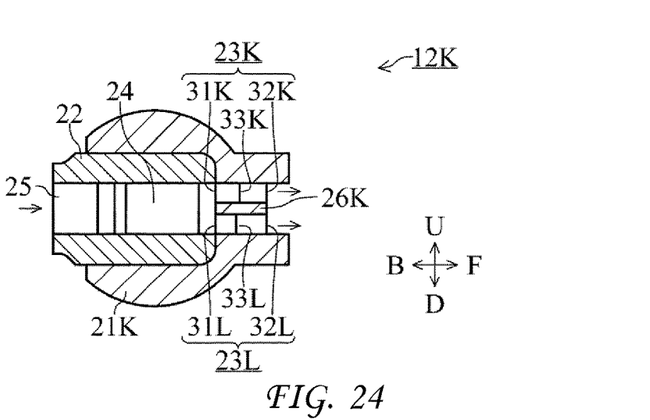
FIG. 24 shows a sectional side view of a jet nozzle.

FIGS. 23 and 24 shows another jet nozzle 12K having a different shape. The washer nozzle 10A may include the jet nozzle 12K in place of the jet nozzle 12A.

In this example, a jet nozzle 12K includes two jetting sections 23K and 23L for one oscillation chamber 24. The jetting sections 23K and 23L are separated with a partition wall 26K perpendicular to U-D direction. The jetting section 23K is located at U side of the partition wall 26K. The jetting section 23L is located at D side of the partition wall 26K.

This enables to jet two liquid current by using no more than one jet nozzle 12K.

In addition, the partition wall 26K can be removed. In other words, the jetting sections 23K and 23L may be connected to each other.

Each of the jetting sections 23K and 23L has a shape, such as a shape similar to one of the jetting sections described in the above embodiments, or a shape obtained by combining the jetting sections described in the above embodiments. They have smaller heights in U-D direction than the oscillation chamber 24.

The jetting section 23K has, e.g., a shape with ability to slant the jet direction of the washing liquid toward L side. The jetting section 23L has an outer central line not parallel to that of the jetting section 23K. It has, e.g., a shape with ability to slant the jet direction of the washing liquid toward R side.

Each of the jetting sections 23K and 23L has a different center in U-D direction from that of the oscillation chamber 24. However, the travelling direction of the washing liquid oscillated in the oscillation chamber 24 changes in a plane perpendicular to U-D direction. Thus, the difference of the center in U-D direction does not affect the jet direction of the washing liquid.

The shape of each of the jetting sections 23K and 23L enables to jet the liquid current within an arbitrary range. Merging the liquid currents jetted from the two jetting section 23K and 23L enables to stably jet the washing liquid toward very broad range.

Figure 25:
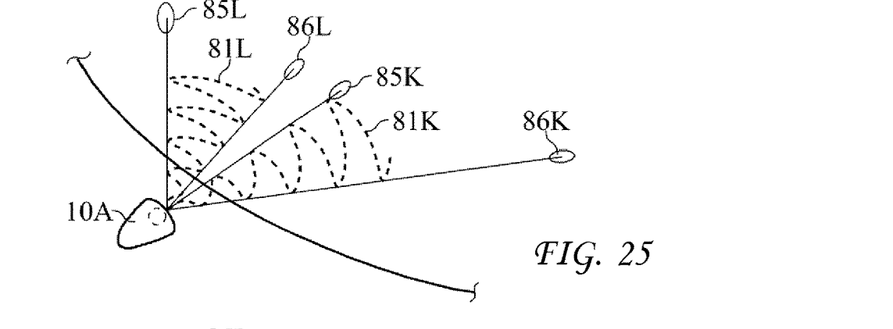
FIG. 25 shows a use mode of a washer nozzle.

In an example shown in FIG. 25, the two liquid currents 81K and 81L may be jetted within separated ranges. This can be achieved, for example, by shaping the jetting section 23K with ability to considerably slant the jet direction of the washing liquid, such as the jetting section 23Q, and shaping the jetting section 23L with ability to considerably slant the jet direction of the washing liquid toward the opposite side. Thereby, four liquid bundles 85K, 86K, 85L and 86L are formed. And, an area where the washing liquid does not hit is formed between the inside liquid bundles.

Figure 26:
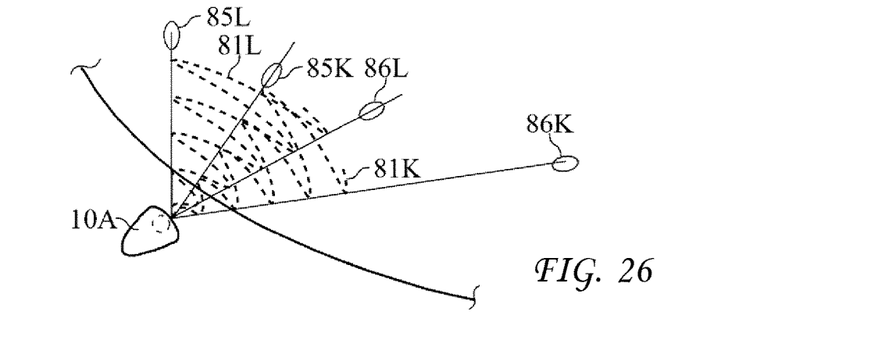
FIG. 26 shows a use mode of a washer nozzle.

Conversely, as shown in FIG. 26, the two liquid currents 81K and 81L may be jetted within overlapped ranges. Thereby, four liquid bundles 85K, 86K, 85L and 86L are formed. The washing liquid hits all areas among them. Furthermore, much washing liquid hits the area where the liquid currents are overlapped than the other areas.

Figure 27:
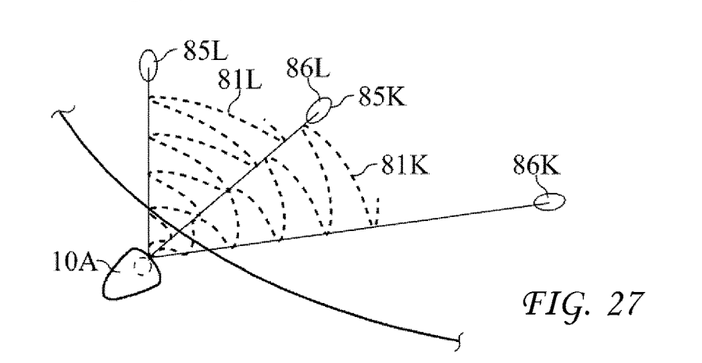
FIG. 27 shows a use mode of a washer nozzle.

Moreover, as shown in FIG. 27, the two liquid currents 81K and 81L may be jetted within adjoining ranges. This can be achieved, for example, by setting the R-side outer line of the jetting section 23K parallel to the L-side outer line of the jetting section 23L. Thereby, the liquid bundle 85K of the liquid current 81K and the liquid bundle 86L of the liquid current 81L are united. The number of the formed liquid bundles becomes three. The washing liquid hits all of the areas among them.

Figure 28:
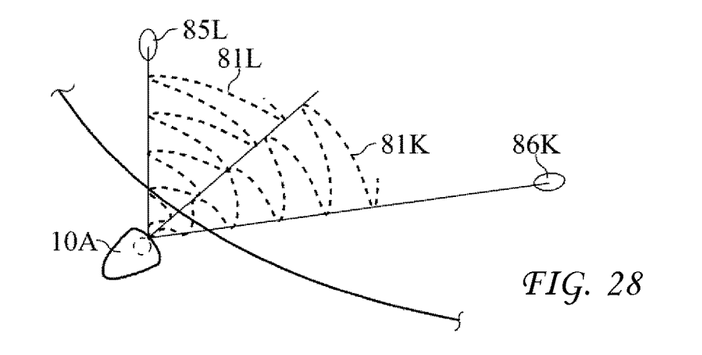
FIG. 28 shows a use mode of a washer nozzle.

Furthermore, as shown in FIG. 28, shaping the jetting sections 23K and 23L with ability to restrain forming a liquid bundle, such as the jetting section 23J, enables to make the number of the liquid bundles two. This looks like the washing liquid is jetted from only one jet port within the extremely broad range.

As described, the area where the washing liquid hits and/or the number of the liquid bundles can be arbitrarily set.

Embodiment 12

Figure 29:
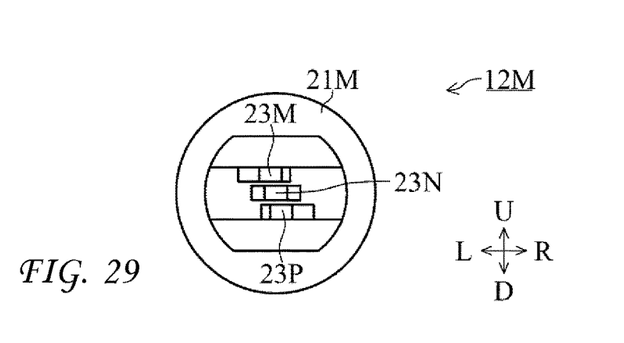
FIG. 29 shows a front view of a jet nozzle.

FIG. 29 shows another jet nozzle 12M having a further different shape. The washer nozzle 10A may include the jet nozzle 12M in place of the jet nozzle 12A.

In this example, a jet nozzle 12M includes three jetting sections 23M to 23P connected to one oscillation chamber 24. As described, the number of the jetting sections may be three or further more.

This enables to further enhance the flexibility of the area where the washing liquid hits and/or the number of the liquid bundles.

Figure 30:
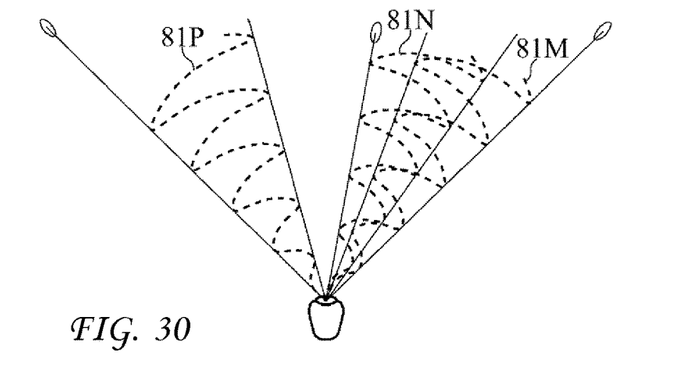
FIG. 30 shows a use mode of a washer nozzle.

In an example shown in FIG. 30, two liquid currents 81M and 81N jetted toward overlapped ranges forms an area the washing liquid concentratedly hits. And, a liquid current 81P jetted toward a separated range from them forms another area the washing liquid hits, and forms an area the washing liquid does not hit between them. As described, various jet patterns can be easily formed. Moreover, the number of the liquid bundles can be set as an arbitrary number within a range not exceeding twice the number of the jetting sections.

In addition, the jet nozzle may include a plurality of oscillation chambers. The plurality of oscillation chambers may have respective reference axes with different directions from each other. Each of the oscillation chambers may be connected to one jetting section, or connected to plural jetting sections.

The above-described embodiments are just for examples to ease to understand the present invention. The present invention is not limited to the embodiments, and contains ones variously modified, altered, added, and/or removed, without departing from the scope of the appended claims. This can be understood by persons skilled in the art.

REFERENCE SIGNS LIST 10A to 10Z: washer nozzle; 11A to 11Z: body; 12A to 12Z: jet nozzle; 21A to 21Z: case; 22: chip; 23A to 23Z: jetting section; 24: oscillation chamber; 241: reference axis; 25: supply port; 26K and 41: partition wall; 31A to 31Z: entrance; 311, 312, 321, 322, and 333 to 338: inner periphery or end; 32A to 32Z: exit; 33A to 33Q: jet port; 331: center; 34Z: guide; 35A to 35Q: inner guide; 351 and 352: inner line; 353: inner central line; 36A to 36Q: outer guide; 361 and 362: outer line; 363: outer central line; 42: main channel; 43: sub channel; 81K to 81Z: liquid current; 82: jet central direction; 83 and 84: jet limit direction; 85 and 86: liquid bundle; 90: automobile; 91: windshield; $\theta_{11}$ and $\theta_{12}$: outer angle; and, $\theta_{21}$ and $\theta_{22}$: inner angle.

The invention claimed is:
1. A washer nozzle, comprising:
a supply port configured to receive supply of liquid;
an oscillation chamber configured to oscillate the liquid supplied through the supply port; and
a jetting section configured to jet the liquid oscillated in the oscillation chamber to the outside,
wherein the jetting section includes a passage connecting the oscillation chamber and the outside, and includes:
an entrance where the liquid enters the passage from the oscillation chamber;
an exit where the liquid is emitted from the passage to the outside;
a jet port provided between the entrance and the exit, having a narrower width than those of the entrance and the exit;
an outer guide including a first planar guide surface and a second planar guide surface directly connecting the jet port and the exit, the first and second planar guide surfaces of the outer guide diverging in a direction of flow; and
an inner guide including a first guide surface and a second guide surface directly connecting the entrance and the jet port, the first and second guide surfaces of the inner guide converging in a direction of flow, the first guide surface of the inner guide being configured to orient the liquid oscillated in the oscillation chamber and hitting against the first guide surface of the inner guide toward the second planar guide surface of the outer guide to hit against the second planar guide surface of the outer guide, and the second guide surface of the inner guide being configured to orient the liquid oscillated in the oscillation chamber and hitting against the second guide surface of the inner guide toward the first planar guide surface of the outer guide to hit against the first planar guide surface of the outer guide, wherein the oscillation chamber is configured to advance the liquid along a reference axis that bisects the supply port and the oscillation chamber, and to repeatedly and reciprocally change a travelling direction of the liquid within a range between a first direction and a second direction, wherein an outer central line extending toward the exit is equidistant between the first and second planar guide surfaces of the outer guide and is not parallel with the reference axis, and wherein the reference axis passes between the first and second planar guide surfaces of the outer guide.

2. The washer nozzle of claim 1, wherein an outer development angle is not greater than an inner development angle, the outer development angle is an angle where the first and second planar guide surfaces of the outer guide meet one other, and the inner development angle is an angle where the first and second guide surfaces of the inner guide meet one other.

3. The washer nozzle of claim 2, wherein the outer central line is substantially equal to an inner central line, and the inner central line bisects the inner development angle.

4. The washer nozzle of claim 1, wherein an outer angle at at least one side of the first and second directions is not greater than an inner angle at an opposite side, the outer angle is an angle where the first or second planar guide surface of the outer guide meets the reference axis, and the inner angle is an angle where the first or second guide surface of the inner guide meets the reference axis.

5. The washer nozzle of claim 1, wherein at least one of the first and second guide surfaces of the inner guide is substantially parallel with the reference axis.

6. The washer nozzle of claim 1, comprising a plurality of the jetting sections connected to one oscillation chamber.

7. The washer nozzle of claim 6, wherein the outer central line in a first jetting section is not parallel with the outer central line in a second jetting section.

8. The washer nozzle of claim 6, wherein the first planar guide surface of the outer guide in a first jetting section is substantially parallel with the second planar guide surface of the outer guide in a second jetting section.

9. The washer nozzle of claim 1, wherein the oscillation chamber is connected to only one supply port.

10. The washer nozzle of claim 1, wherein the oscillation chamber includes left and right partition walls dividing a space within the oscillation chamber into a central main channel and left and right sub channels, and liquid passes through the left and right sub channels to return from a side closer to the jetting section to a side closer to the supply port.

11. The washer nozzle of claim 1, wherein the first and second guide surfaces of the inner guide are planar or concave, but not convex.

12. A washer nozzle, comprising:

a supply port configured to receive supply of liquid;

an oscillation chamber configured to oscillate the liquid supplied through the supply port; and a jetting section configured to jet the liquid oscillated in the oscillation chamber to the outside, wherein the oscillation chamber is configured to advance the liquid along a reference axis that bisects the supply port and the oscillation chamber, and to repeatedly and reciprocally change a travelling direction of the liquid within a range between a first direction and a second direction, wherein the jetting section includes a passage connecting the oscillation chamber and the outside, and includes:
  an entrance where the liquid enters the passage from the oscillation chamber;
  an exit where the liquid is emitted from the passage to an outside;
  a jet port provided between the entrance and the exit, having a narrower width than those of the entrance and the exit;
  a first planar outer guide surface directly connecting an end of the jet port in the first direction and an end of the exit in the first direction;
  a second planar outer guide surface directly connecting an end of the jet port in the second direction and an end of the exit in the second direction, the first and second planar outer guide surfaces diverging in a direction of flow;
  a first inner guide surface directly connecting an end of the entrance in the first direction and the end of the jet port in the first direction, and configured to orient the liquid oscillated in the oscillation chamber and hitting against the first inner guide surface toward the second planar outer guide surface to hit against the second planar outer guide surface; and
  a second inner guide surface directly connecting an end of the entrance in the second direction and the end of the jet port in the second direction, the first and second inner guide surfaces converging in a direction of flow, and the second inner guide surface being configured to orient the liquid oscillated in the oscillation chamber and hitting against the second inner guide surface toward the first planar outer guide surface to hit against the first planar outer guide surface, wherein an outer central line extending toward the exit is equidistant between the first and second planar outer guide surfaces and is not parallel with the reference axis, and wherein the reference axis passes between the first and second planar outer guide surfaces.

13. The washer nozzle of claim 12, wherein the outer central line is substantially equal to an inner central line equidistant between the first and second inner guide surfaces.

14. The washer nozzle of claim 12, further comprising a plurality of the jetting sections connected to one oscillation chamber.

15. The washer nozzle of claim 14, wherein the outer central line in a first jetting section is not parallel with the outer central line in a second jetting section.

16. The washer nozzle of claim 14, wherein the first planar outer guide surface in a first jetting section is substantially parallel with the second planar outer guide surface in a second jetting section.

17. The washer nozzle of claim 12, wherein the oscillation chamber is connected to only one supply port.

18. The washer nozzle of claim 12, wherein
the oscillation chamber includes left and right partition walls dividing a space within the oscillation chamber into a central main channel and left and right sub channels, and
liquid passes through the left and right sub channels to return from a side closer to the jetting section to a side closer to the supply port.

19. The washer nozzle of claim 12, wherein the first and second inner guide surfaces are planar or concave, but not convex.

* * * * *